Figure 1A:
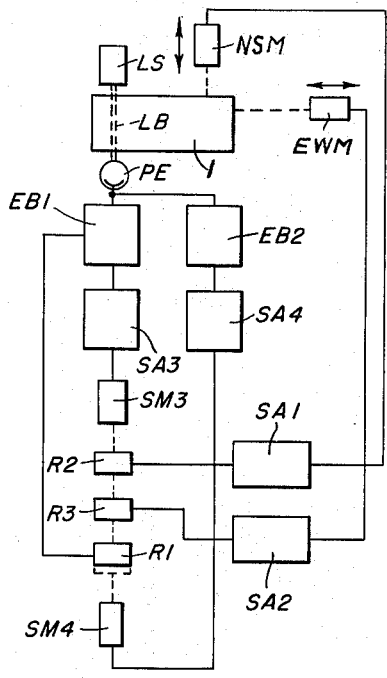

Nov. 2, 1965   W. E. PATTERSON   3,215,914
FAST AND SLOW DUAL PHOTO-CELL BRIDGE PLURAL SERVO-MOTOR
CONTROL FOR DUPLICATING MACHINES
Filed Aug. 28, 1962   2 Sheets-Sheet 1

INVENTOR
William E. Patterson
BY
Kenyon, Palmer, Stewart & Estabrook
ATTORNEYS

INVENTOR
William E. Patterson
BY
Kemon, Palmer, Stewart & Estabrook
ATTORNEYS

United States Patent Office 3,215,914
Patented Nov. 2, 1965

3,215,914
FAST AND SLOW DUAL PHOTO-CELL BRIDGE PLURAL SERVO-MOTOR CONTROL FOR DUPLICATING MACHINES
William E. Patterson, 3505 Monegro St., Coral Gables, Fla.
Filed Aug. 28, 1962, Ser. No. 219,893
4 Claims. (Cl. 318—19)

This invention concerns a novel control system for a contouring or duplicating machine. A contouring machine automatically duplicates on a workpiece the outline of a template or pattern placed on the machine, or by use of a control tape upon which instructions have been placed.

There are two general types of contouring machines; the digital type and the analog type. The digital type moves a cross-feed table in discrete precise increments as instructed by pulses of information obtained from a magnetic or punched tape. This type of machine can reproduce a machine part with very high percision and is used in the manufacture of jet engine and aircraft parts, for example. This type of machine, by its nature, is expensive to build and requires that the original drawing be converted to digital information. Also, the cutting or other duplicating operation on the workpiece is not made along a smooth continuous line but along a stepped line or path.

My invention is concerned with the second general type, the analog contouring machine. It uses a template or drawing placed on the cross-feed table to provide the information for duplication and causes a cutting tool to reproduce the outline of the template or drawing on a workpiece. The accuracy of this type of machine is usually not as good as the digital type but for a great many purposes is more than adequate. For example, in the making of such things as novelties, garden cutouts, ornamental pieces, high precision is not necessary. However, the invention, with proper design, is capable of reasonable accuracy. No punched or magnetic tapes are required and, in my invention, an actual specimen of the piece that is to be reproduced can be used as the template, if desired. Otherwise, a template can be cut from opaque paper or thin metal with a pair of scissors.

Various types of analog contouring machines have been developed. These include the use of mechanical styluses which follow the edge of a thick template, magnetic coil pickups which follow the edge of a template made of magnetic material, and photoelectric systems consisting of vibrating light beams, rotating shutters, etc. All of these systems have obvious disadvantages, both mechanically and electrically.

In the preferred form of my invention, a single beam of light and photoelectric cell are used as the means of detecting the edge of the template and only a single circular beam of light is required to determine direction of cutting and other information required in the duplicating operation. It is not necessary to use sensing devices of the types using rotating shutters, vibrating light beams, or other forms of periodically moving feeler or sensing elements.

An object of my invention is to provide a control system which will produce a duplicating cutting operation along a smooth continuous path, and at a constant speed along said path, regardless of its direction.

To provide a constant speed of cutting, the two cross-feed motors, which produce relative movement between the workpiece and the cutting tool in east-west and north-south directions, are controlled for simultaneous operation at different speeds, depending upon the required direction of cutting. The speeds of the two feed motors are controlled so that one motor (the north-south motor) operates at maximum speed when the direction of cutting is either directly north or directly south, while the east-west motor remains stationary. Likewise, when the direction of cutting is either directly east or directly west, east-west motor operates at maximum speed and the north-south motor remains stationary. For intermediate directions of cutting the two motors are installed so that one varies in speed according to the sine function of the angle by which the cutting direction varies from a reference direction, such as north, and the speed of the other motor varies acording to the cosine function of the same angle. This is accomplished by using D.C. motors which vary in speed directly in accordance with the applied voltage, and supplying the motors with operating voltages from two ganged potentiometers having sine and cosine characteristics.

Another object is to devise a control system using two error bridges to control the feed motors to restore the machine to the proper cutting direction upon a deviation between the beam and the template. One error bridge is quick-acting and controls the ganged potentiometers to change the direction of cutting, and also operates the movable contact on a re-balancing potentiometer forming part of the bridge. The second error bridge and the devices controlled by it are of a slower response characteristic and operate to turn the case of the re-balancing potentiometer in a direction to shift the balance point of such potentiometer and in a direction to avoid overshooting of the balancing operation.

Figure 1:
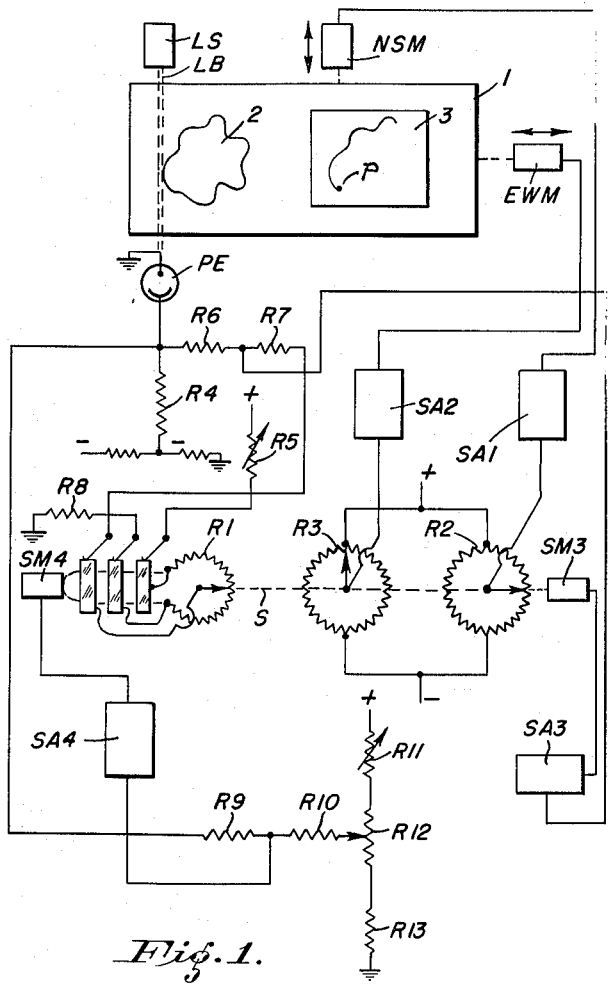
Figure 1B:
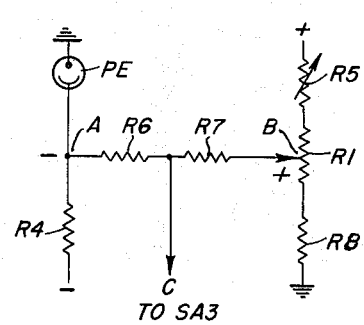
Figure 1C:
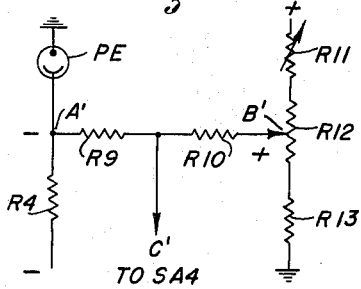
Figure 2:
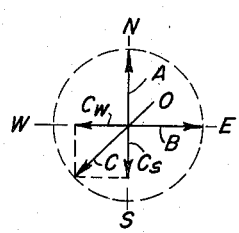
Figure 3:
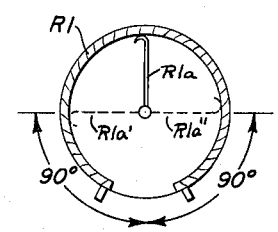
Figure 4:
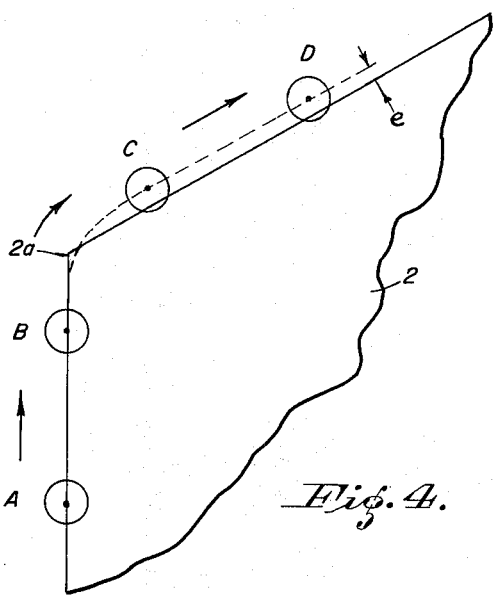
Figure 5:
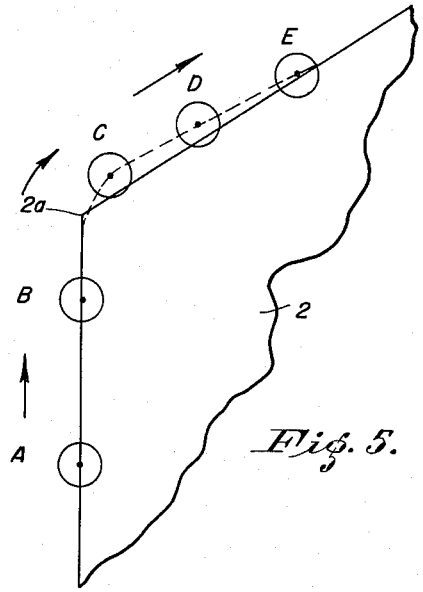
Figure 6:
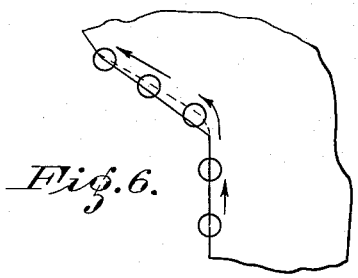
Figure 7A:
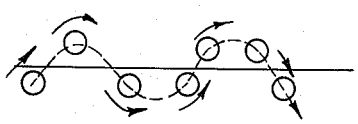
Figure 7B:
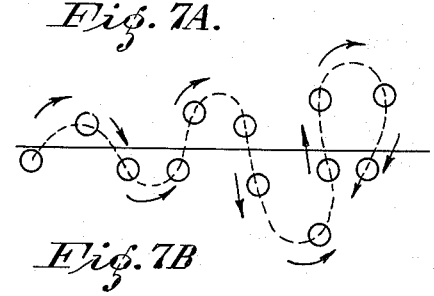
Figure 8:
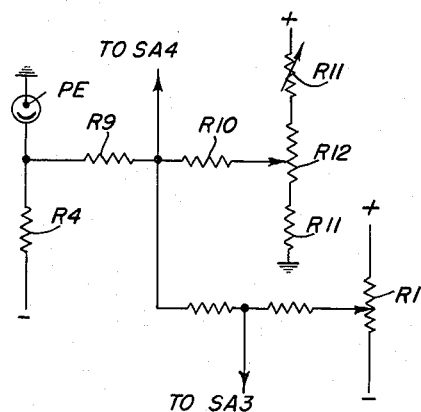

A preferred form of the invention is shown in the accompanying drawing in which:
FIGURE 1 is a complete circuit diagram of the control system;
FIGURE 1A is a block diagram showing the system in simplified form;
FIGURES 1B and 1C are simplified drawings of the two error bridges;
FIGURE 2 is a diagram illustrating the relation between the two components of speed for different directions of cutting;
FIGURE 3 is a diagram for explaining the operation of the speed controlling potentiometers;
FIGURES 4, 5, and 6 are diagrams showing how the light beam follows the edge of the template;
FIGURES 7A and 7B illustrate the operation of the system with only one error bridge functioning; and
FIGURE 8 is a diagram showing the two error bridges combined in one circuit.

FIGURE 1 illustrates the essential elements of the invention. A horizontal cross feed-table 1 holds the template 2 and workpiece 3. The table is moved to left and right on the drawing by the east-west motor EWM. It is moved to top and bottom on the drawing by the north-south motor NSM. Any direction of movement of the table between these two directions can be obtained by a combination of both motors running simultaneously. A point light source LS is placed above the template 2 and is attached to the immovable frame of the machine. The concentric light beam LB which has a very small diameter, passes by the edge of the template so that half of the beam falls on the template and the other half passes through the table into a photoelectric cell PE. It will be understood that the portion of table 1 carrying the template will be formed of transparent material, such as glass or plastic. The cell PE is attached to the immovable frame of the machine directly under the point light source LS. The output of the photocell is fed into error bridges EB1 and EB2. These, in turn, control the servo motors SM3 and SM4 through servo amplifiers SA3 and SA4. The servo motor SM3 rotates the sliding contacts on potentiometers R1, R2 and R3, and servo motor SM4 rotates the resistance element of potentiometer R1. Potentiometer R2 applies a voltage through servo amplifier SA1 to the north-south motor NSM. The speed and direction of rotation of the motor is controlled by the voltage and polarity applied by the potentiometer. Likewise, potentiometer R3 controls the direction and speed of operation of the east-west motor EWM through servo amplifier SA2.

As long as the light beam is centered on the edge of the template so that half of the beam is intercepted by the template, the error is zero and the error bridges have a zero output. Therefore, servo motors SM3 and SM4 do not run. The potentiometers R2 and R3 keep the cross feed motors running with a set or fixed relationship of speed and direction. However, if the light beam becomes unbalanced, that is, is more than half on or half off the template, the error bridges cause servo motors SM3 and SM4 to rotate potentiometers R1, R2, and R3 in such a way as to change the speed and relationship between the cross-feed motors to change the direction of movement of the table so that the error of the light beam is corrected. In this manner, the light beam can follow the change in the edge of an intricate template and travel completely around the template. Obviously, as the table moves to cause the light beam to follow the edge of the template, the workpiece is moved in the same manner. If, for example, a cutting blade or other cutting tool is operating on the workpiece at the point P, the moving table will cause the blade to cut the workpiece and duplicate very closely the shape of the template.

A detailed description of the operation of the machine will now be given:

In order to move the cross feed table in any and all directions at a constant rate of speed so that the workpiece will be cut at a constant rate, it is necessary for the relationship of cross feed motor speeds to always be such that the resultant cross feed table speed is a constant. The cross feed table speed and direction is the resultant of the vector combination of the two cross feed motor speeds. This is illustrated in FIG. 2 in which the relative speed between the table and the cutting tool, or between the table and the light beam, is represented by a vector of constant length which may assume any position about the point 0. Thus, in the A position of the vector, the table is being driven in a direction due north, and the north-south motor would be operating at maximum speed, while the east-west motor EWM would be stationary. If the table is to move in a due east direction as shown by the vector position B, the east-west motor EWM would operate in one direction at a maximum speed, while the north-south motor NSM would be stationary. For any other direction of movement of the table, such as the south-west direction represented by the vector position C, the east-west motor would operate the table in a westerly direction at a speed represented by the vector Cw, while the north-south motor would operate the table in a southerly direction at a speed represented by the component vector Cs. The resultant speed of movement of the table in a south-west direction is represented by the magnitude of vector C, which is the sum of the vectors Cw and Cs. From this simple diagram, it is clear that in order for the resultant speed vector to remain of a constant magnitude for any position of the vector about the point 0, the east-west motor EWM must vary in speed according to the sine function of the angle of the speed vector with respect to the due-north direction, and the speed of the north-south motor NSM will vary according to the cosine function of the same angle.

Referring to FIG. 1, it will be noted that the servo amplifiers SA1 and SA2 are controlled by potentiometers R2 and R3. R2 is a precision continuous rotation potentiometer with a sine taper resistance element. R3 is the same potentiometer with the pickup arm rotated 90°, thus becoming a cosine curve compared to potentiometer R2. The potentiometer sliding contacts are ganged together mechanically, as represented by the dotted line shaft S, and thus as they are rotated, one pickup arm is always 90° in advance of the other. By applying positive and negative voltage to the terminals of the two potentiometers with respect to ground, as shown in FIG. 1, the contact arms of the potentiometers go from maximum positive voltage to maximum negative voltage as they rotate 180°. Halfway between (90°) they are zero voltage with respect to ground. At 45° the voltage is .707 of maximum since the potentiometers have a sine resistance taper. It can be readily seen that the voltage emanating from these potentiometers duplicate the motor-speed components shown in FIG. 2. Therefore, if the ganged potentiometer are rotated, the voltages feeding the servo amplifiers will control motors EWM and NSM in the right relationship to cause the cross feed table to move in any desired direction at a constant rate of speed, provided that the speeds of the servo motors are always proportional to the resistance of R2 and R3. Potentiometers R2 and R3 could have a linear taper, if desired, but the cross feed table speed would not be the same for all directions. For some applications this could be tolerated but for maximum performance the sine taper is needed.

The heart of my invention is the means of controlling these potentiometers by a single concentric or circular beam of light in such a way as to cause the cross-feed table to follow the edge of the template. This is accomplished by the use of two error bridges shown by blocks EB1 and EB2 in FIG. 1A.

As shown in FIG. 1A, error bridge EB1 controls servo motor SM3 through a servo amplifier SA3 and directly rotates the pickup arm shafts of potentiometers R1, R2, and R3. R1 is a part of error bridge EB1. The bridge consists of resistors R1, R4, R5, R6, R7, R8, and photoelectric cell PE. A simplified diagram of the bridge is illustrated in FIG. 1B. One leg of the bridge consists of the photoelectric cell, and its associated load resistance R4 connected to a negative source of voltage. The other leg of the bridge consists of rheostat R5, potentiometer R1, resistor R8 and a positive source of voltage connected to R5. The two legs of the bridge should have a much lower impedance than the coupling resistors R6 and R7 so that their effect on each other will be very little. With the light beam centered on the edge of the template, a certain negative voltage appears at point A in FIG. 1B. With potentiometer R1 adjusted so that the contact arm R1a is in the center of the potentiometer resistance, as shown in the solid line position in FIG. 3, the rheostat R5 is adjusted so that point B has a positive voltage equal to the negative voltage at point A. The bridge is now balanced and the output of the bridge at point C is zero voltage. If we now move the template so that the light beam is cut off, the photoelectric cell's internal resistance becomes very high and the negative voltage at point A becomes almost equal to the supply voltage. Since the negative voltage at point A is now of greater magnitude than the positive voltage at point B, the bridge is unbalanced and a negative voltage will appear at the bridge output point C. In order to balance the bridge again, it is necessary to rotate the arm of potentiometer R1 toward its high voltage end until point B reaches a positive voltage equal to the negative voltage of point A. The output of the bridge will again be zero voltage. Likewise, if the template is moved until the whole light beam is received by the photoelectric cell, the resistance of the cell will be relatively low. This will cause point A to be at a much lower negative voltage than before. Since the voltage at point A is now of lower magnitude than the positive voltage of point B the bridge will again be unbalanced but this time a positive voltage will appear at point C. In order to again balance the bridge it is necessary to rotate the arm of the potentiometer R1 toward the ground end of the resistance until the magnitudes of the voltages at point A and point B are equal. Therefore, for any percentage of the light beam falling on the photoelectric cell there is a certain portion of the potentiometer R1 arm required to achieve a balance of the bridge. If we have a linear resistance potentiometer we can convert, therefore, any error of the light beam from its normal half-on and half-off position to an angular position of the potentiometer arm to one side or the other from its normal centered position. By selecting the correct values of voltage and resistance in the R1 leg of the bridge the maximum error position of the potentiometer arm can be made any number of degrees (for example, ±90°) each side of the normal position as shown in dotted lines R1a' and R1a'' in FIG. 3. If desired, the maximum error position of the potentiometer arm can be made as much as ±170°.

The output of the bridge EB1 is connected to servo amplifier SA3 which in turn drives servo motor SM3 (see FIG. 1). This motor, as previously stated, rotates the arms of cross feed motor potentiometers R2 and R3 and the bridge potentiometer R1 mentioned above. With the proper motor polarity the error voltage from the bridge, when it appears, will cause the motor to rotate the arm of potentiometer R1 to the correct point to achieve bridge balance. At this point the error voltage becomes zero and the motor stops running. If the error voltage reverses, the motor will reverse its direction and rotate the potentiometer arm in the opposite rotation until balance is achieved. Thus, for any percentage of the light beam falling on the photoelectric cell the motor will adjust the potentiometer R1 to conform to the balance position, as illustrated in FIG. 3.

Since motor SM3, in rotating potentiometer R1, also rotates the cross feed potentiometers R2 and R3, the direction of cross feed table movement is changed. The cross feed motors are connected so that if, for example, the light beam is too far off the template the change of potentiometer position R1 will cause the cross feed motors to move the template in the correct direction to intercept the light beam more.

FIG. 4 illustrates the action of the error bridge EB1 in causing the light beam to follow the edge of a portion of a template when acting alone. A, B, C and D are consecutive positions of the light beam as the template moves. Assume that the light beam is at position A and centered on the edge of the template. Assume also that the arms of cross feed motor potentiometers R2 and R3 have been adjusted so that the cross feed motors will move the template in such a manner as to keep the light beam centered on the edge of the template (this is done automatically by error bridge EB2 and will be explained shortly). Under these conditions, as the light beam proceeds along the edge of the template from A to B, no error voltage will appear at the output of error bridge EB1 and the cross feed motors will continue driving the template in a straight line. However, when the spot of light arrives at the sharp corner 2a where the template changes direction, the light beam will begin to move more than halfway off the template. When this occurs, a positive voltage will appear at the output of error bridge EB1, and this will cause servo motor SM3 to rotate the arms of potentiometer R2, R3 and R1 until the change in position of R1 correct the error in the bridge. This, as explained above, causes the cross feed motors to change the direction of movement of the template in the correct direction to cause the light beam to move along the edge of the template in the new direction. The potentiometer R1 continues to rotate as the light beam moves off the template until the error voltage is just sufficient to cause R1 to be rotated to the angular change of the template. Under these conditions the cross feed motors move the template so that the light beam maintains its position along the new edge of the template as illustrated from C to D in FIG. 4. The dotted line designates the path taken by the center of the light beam as it turns the corner and travels along the edge. It will be noted that in order to maintain this new direction the light beam must remain far enough off the edge of the template to keep potentiometer R1 rotated off normal to the same angle as the change in direction of the template. Thus, if error bridge EG1, alone, controls the machine, any direction of the template different from the initial direction will cause an error (e) in the cut of the workpiece. For certain purposes, such as making novelty items, garden cutouts, etc., a slight error would be unimportant. However, a more serious problem in the fact that the cross feed table cannot change direction more than the angle which potentiometer R1 can be rotated for maximum error voltage (which would be about 170°). Thus, the machine could not proceed completely around the template without reversing itself.

This problem is overcome by the addition of error bridge EB2. This bridge is illustrated in FIG. 1C. It will be noted that schematically this bridge appears identical to error bridge EB1. However, whereas in error bridge EB1 potentiometer R1 arm was automatically adjusted for bridge balance by servo motor SM3, the equivalent potentiometer R12 in error bridge EB2 is adjusted manually and the adjustment is not changed except when realignment is required (such as for ageing of the photoelectric cell). One leg of bridge EB2 consists of the same photoelectric cell PE and load resistor R4 as used for error bridge EB1. The principle of operation of the bridge is the same as for error bridge EB1. When the light beam is more than halfway off the template a positive voltage appears at the output of the bridge at point C'. When the light beam is less than halfway on the template a negative voltage appears at point C'. In this case the bridge output is fed into servo amplifier SA4 which controls servo motor SM4 which rotates the resistance element of potentiometer R1. The connections to the potentiometer (as shown in FIG. 1) are completed through slip rings so that the potentiometer case is free to rotate and still allow the electrical information to be obtained from it. When an error voltage appears at the output of the bridge, the motor SM4 is caused to rotate slowly, and in so doing rotates the resistance element of potentiometer R1. This, in effect, changes the position of the center of the potentiometer resistance with reference to the arm of the potentiometer and thereby creates a new normal balance position of potentiometer R1. Since the resistance elements of potentiometers R2 and R3 are stationary with reference to the resistance element of potentiometer R1, the new normal balance position of R1 changes the position of the arms of R2 and R3, thereby changing the direction of movement of the cross feed table. If the servo motor SM4 is connected correctly it will rotate the potentiometer R1 resistance element in a direction to cause the cross feed table to move so as to center the light beam again on the edge of the template. If we consider the action of error bridge EB2 by itself the light beam can theoretically be made to follow the edge of the template by oscillating back and forth across the edge as it travels along, as shown in FIG. 7A. Once an error voltage appears at bridge EB2 the light beam can never do more, theoretically, than oscillate along the edge of the template, always hunting for the balance position. This is because, when an error is detected, the path of the light beam describes an arc due to the turning of potentiometers R2 and R3 (as described above). Therefore, the light beam reaches its balance position, half on the template, at the same angle at which it left. It then continues onto the template and is turned back across the edge again at the same angle. In a practical machine, however, due to static friction, differences in starting and stopping voltages of the servo motors, etc., the angle becomes steeper each time the light beam crosses the edge until the beam actually reverses itself. This is illustrated in FIG. 7B. It is evident, therefore, that error bridge EB2, by itself, will not serve the purpose of guiding the light beam along the template. However, when the two error bridges operate together the desired action is accomplished.

In the complete machine, since both error bridges act together, the cross feed motors are controlled simultaneously by them. In FIG. 4, with error bridge EB1 alone operating, we found that when the light beam encountered a permanent change in direction of the template it could only maintain the cross feed motors in this direction by maintaining an error in the cutting of the workpiece. However, if the same action is repeated with the addition of error bridge EB2 operating a different result is obtained as is illustrated in FIG. 5. When the light beam encounters the change of direction of the template at the sharp corner, an error voltage is generated in both bridges. The action of error bridge EB1 is as previously described and an immediate change in direction of travel of the table takes place. In addition, error bridge EB2 and the elements controlled by it act more slowly and rotate the R1 potentiometer resistance element so that the normal balance position of the potentiometer is altered. Since the error voltage in bridge EB1 at this instant is the same as illustrated in FIG. 4, servo motor SM3 must rotate the arm of potentiometer R1 to maintain the error angle position as explained in FIG. 3. This, in effect, causes the center of the beam to move closer to the template. As long as the light beam is not centered on the edge of the template, an error voltage is created in error bridge EB2 and continues to cause the normal balance position of potentiometer R1 to be shifted. However, as the center of the light beam approaches the edge of the template the error voltage of error bridge EB1 is reduced and the arm of potentiometer R1 slowly approaches the normal balance position. It is evident that the only condition under which both bridges can have a zero output voltage simultaneously is when the beam is centered on the edge of the template. Therefore, a short time after the corner of the template is encountered, the beam has turned the corner and has adjusted itself to the new direction. At C in FIG. 5 the maximum error voltage is being applied to both bridges. At D the center of the light beam is approaching the edge of the template and the error angle of potentiometer R1 is being reduced. At E both bridges are balanced and the light beam is following the edge of the template with no error of cut. FIG. 6 illustrates the action when the template changes direction opposite to that of 5. As can be seen, the action of the bridges and servo motors will be reversed.

Obviously, the errors of cut shown in the illustrations are exaggerated and in a practical system a reasonable degree of accuracy can be achieved. The magnitude of the error at C in FIG. 5 and the time taken to correct the error depends on the speed of response of the servo motors, inertia, cutting speed, etc. By the use of modern low inertia servo motors and potentiometers, damping systems, networks, etc., the optimum can be achieved. Also, if no sharp corners are used on the template and the response of the system is great enough, for all practical purposes the error of cut can be made insignificant. To obtain maximum results the response of servo motor SM3 should be as rapid as possible (the closer to instantaneous the better) while servo motor SM4 should respond much slower.

In the foregoing explanation no details have been shown for the servo amplifiers and motors. Any usual servo system can be utlized. The servo amplifiers can be D.C. amplifiers, A.C. chopper type, magnetic transistor, etc. The motors can be 2 phase A.C., D.C., etc. Standard tachometer generators and feedback control can be utilized, if desired, so as to keep the servo motors proportioned to the input voltages.

It will be obvious to those skilled in the art that the light beam which traces the template or pattern need not pass through the table, but may be reflected from a pattern path of contrasting color, such as a black strip outlining the pattern to be reproduced, and the photocell may be located on the same side of the template as the light so as to pick up light reflected partly from the background area and partly from the pattern path.

It should be mentioned that the two error bridges should be adjusted so that their output is zero when the light spot is centered on the edge of the template. The bridges shown use a vacuum or gas type photoelectric cell. Obviously, other types of photoelectric cells can be used, such as photoemissive, photoconductive or phototransistor with proper changes in circuit values and voltages. FIGURE 9 shows a variation of the bridges so that one initial adjustment can control the balance point.

I claim:

1. A system for controlling the relative movement between a work piece and a cutting element in a contouring machine in which both the work piece and a control template are carried by a work table mounted for rectilinear movement in two directions at right angles to each other, and a sensing device cooperates with the edge of said template to produce distinguishable responses upon a departure of the template towards or away from said sensing device, said system comprising a pair of reversible feed motors for driving said work table in directions at right angles to each other, circuit means for energizing said motors to effect a constant rate of relative movement between said cutting element and said table, said circuit means includes means for varying the speed of one motor according to the sine function of the angle between the desired direction of cutting and the direction of table drive by one of said motors, and for varying the speed of the other motor according to the cosine function of the same angle, said circuit means also including an error bridge controlled by said sensing device, and being operable in response to departure of the template from the sensing device in one direction to effect operation of said motors in one direction, and responsive to departure of the template from the sensing device in the opposite direction, to reverse the direction of operation of said motors, whereby said system is effective for controlling said work table so that said cutting element may trace a completely closed path on said work piece, speed-control means controlled by said sensing device upon departure of said sensing device from the edge of said template to vary the speeds of said motors to effect a change in the direction of movement of said table, said speed-control means comprising two-interlocked potentiometers controlled by said sensing device and having sine and cosine output characteristics respectively, and a pair of servo-motors controlled by said potentiometers and operating said feed motors at speeds in accordance with the voltage outputs of said potentiometers, and said speed-control means including a normally balanced error bridge controlled by said sensing device and being unbalanced upon departure of said sensing device from a normal tracing position with respect to said template, a balancing potentiometer connected in said error bridge, and means for operating said balancing potentiometer by operation of said interlocked potentiometers.

2. A control system according to claim 1 wherein said balancing potentiometer includes a rotary resistance element, and said speed-control means includes a second error bridge controlled by said sensing device, and a servo-motor operated in response to unbalance in said second error bridge for rotating the resistance element of said balancing potentiometer.

3. A system for controlling the relative movement between a work table and a cutting element in a contouring machine in which a control template is carried by said work table and a sensing device cooperates with the edge of said template to produce distinguishable responses upon a departure of the edge of the template towards or away from said sensing device, said system comprising a pair of feed motors for driving said work table in directions at right angles to each other, circuit means for energizing said motors, a normally balanced error bridge controlled by said sensing device and being unbalanced upon departure of said sensing device from a normal tracing position with respect to said template, first servo-motor means controlled by the unbalance of said error bridge and operating to vary the relative speeds of said motors to effect change in the direction of movement of said table, a balancing potentiometer connected in said error bridge, means for operating the contact arm of said balancing potentiometer by operation of said first servo-motor means to effect rebalancing of said error bridge, said balancing potentiometer having a rotary resistance element, a second error bridge controlled by said sensing device, and second servo-motor means operated in response to unbalance in said second error bridge for rotating the resistance element of said balancing potentiometer and thereby effecting a rotation of the balancing position of the contact arm of said balancing potentiometer, said second error bridge and the second servo-motor means having a slower response time than said first error bridge and the first servo-motor means.

4. In a system for controlling the relative movement between a work table and a cutting element in a contouring machine in which a sensing device cooperates with the edge of a control template to produce distinguishable responses upon a departure of the edge of the template towards or away from said sensing device, said system also including a motor for producing relative movement between said cutting element and said work table and relative movement between said template and said sensing device, the combination of a normally balanced error bridge controlled by said sensing device and being unbalanced upon departure of said sensing device from a normal tracing position with respect to said template, first servo-motor means controlled by the unbalance of said error bridge and operating to drive said motor to effect change in the relative direction of movement between said cutting element and said table, a balancing potentiometer having a contact arm connected in said error bridge, means for operating the contact arm of said balancing potentiometer by operation of said first servo-motor means to effect rebalancing of said error bridge, said balancing potentiometer having a resistance element mounted for rotary turning with respect to said contact arm, a second error bridge controlled by said sensing device, and second servo-motor means operated in response to unbalance in said second error bridge for rotating the resistance element of said balancing potentiometer and thereby effecting a rotation of the balancing position of the contact arm of said balancing potentiometer, said second error bridge and the second servo-motor means having a slower response time than said first error bridge and the first servo-motor means.

References Cited by the Examiner

UNITED STATES PATENTS

| | | | |
|---|---|---|---|
| 2,261,644 | 11/41 | Cockrell. | |
| 2,410,295 | 10/46 | Kuehni et al. | 318—39 |
| 2,499,178 | 2/50 | Berry et al. | |
| 2,717,979 | 9/55 | Gordiner | 318—162 X |
| 2,723,845 | 11/55 | Pizejbylski et al. | |
| 2,948,840 | 3/58 | Haldemann et al. | |
| 2,837,707 | 6/58 | Stokes | 318—39 |
| 2,838,683 | 6/58 | Munro. | |
| 2,853,626 | 9/58 | Wetzel | 318—39 X |
| 3,004,166 | 10/61 | Green. | |
| 3,021,463 | 2/62 | Haldemann. | |
| 3,035,216 | 5/62 | Rhoades et al. | 318—39 X |

FOREIGN PATENTS

| | | |
|---|---|---|
| 1,103,602 | 11/55 | France. |
| 949,117 | 9/56 | Great Britain. |

ORIS L. RADER, *Primary Examiner.*